June 3, 1941.  C. B. HARBISON  2,244,618
RETURN BEND FITTING
Filed Jan. 25, 1940
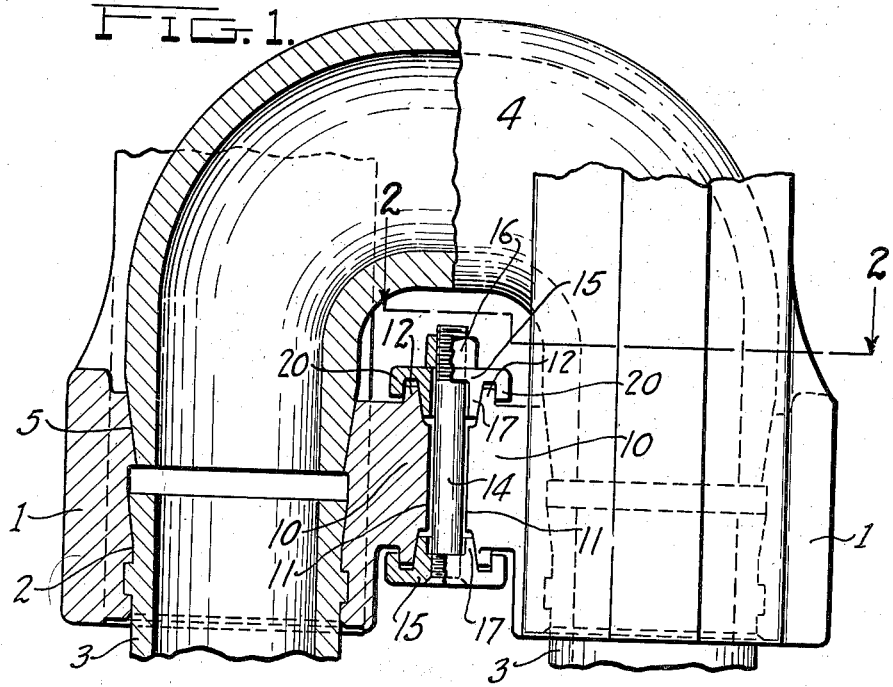
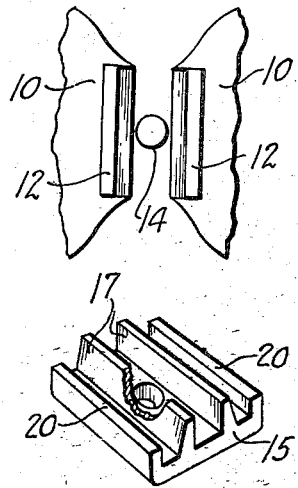
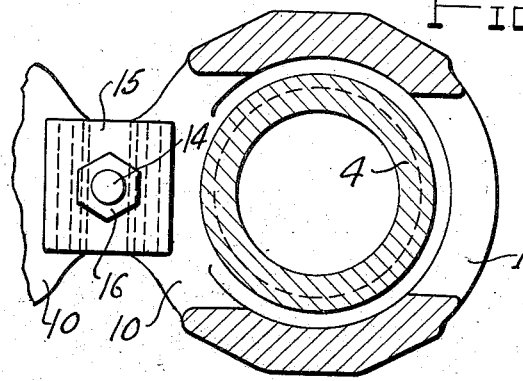
Inventor
Clarence B. Harbison
By Owen & Owen,
Attorneys.

Patented June 3, 1941

2,244,618

UNITED STATES PATENT OFFICE 2,244,618

RETURN BEND FITTING

Clarence B. Harbison, Lima, Ohio, assignor to The Ohio Steel Foundry Company, Lima, Ohio, a corporation of Ohio Application January 25, 1940, Serial No. 315,546

2 Claims. (Cl. 285—20)

This invention relates to improvements in return bend fittings for oil refineries or the like, and more particularly to such fittings in which the tube-receiving yoke or housing is made in separate pieces for the respective tubes.

An object of the invention is the provision of a fastening means for the two yoke sections adapted to positively adjust the sections to a predetermined tube center spacing and to firmly and securely lock them in such adjustment, whereby to hold the proper relationship of the tubes during the rolling-in operation and being operable at the same time to enable limited relative adjustment of a pair of tubes and the attached yoke sections to provide a slight amount of flexibility to permit proper close joint fitting of the U-bend member in the yoke seats to prevent leakage under high temperatures and pressures.

A further object of the invention is to improve the fitting disclosed in my prior Patent No. 2,043,436, to enhance the practicability and commercial value thereof, and to lower the cost of production by simplifying the machining operation.

Further objects and advantages of the invention will be apparent from the following detailed description, and from the accompanying drawing, in which—

Figure 1 is an elevation of a U-bend fitting embodying the invention and attached to a pair of tubes, with parts broken away; Fig. 2 is a fragmentary section on the line 2—2 in Fig. 1; Fig. 3 is a fragmentary view similar to Fig. 2, with the fastening means removed, except that the position of the fastening stem is shown, and Fig. 4 is a perspective view of one of the fastening members, with a part broken away.

In the embodiment of the invention illustrated in the drawing, 1, 1 designate two separate yoke sections of a return bend housing adapted to be assembled in side by side relation and each having an opening 2 therein in which the end of a tube 3 of a refining still or the like may be suitably secured, as by a rolling operation, in parallel relation to its companion tube.

A U-bend member 4 connects the outer ends of the openings 2 of a pair of yoke sections by fitting at its ends into tapered seats 5 in the sections, as well understood in the art. The manner of mounting and holding the U-bend member in engagement with the yoke sections forms no part of the present invention and is therefore not shown and described.

For the purpose of the present invention, each yoke section 1 is provided at its inner side with a boss-like extension 10 in directly opposing relation to the extension of the other section. The adjacent or confronting faces 11 of these extensions are plain, or substantially so, and ordinarily are disposed in spaced parallel relation when the sections are properly assembled. At each inner and outer end edge of each extension 10 is provided a lip or flange 12 which is parallel to the adjacent flange of the opposing extension and is perpendicular to a plane parallel to and intersecting the axes of the openings of two assembled yoke sections. The inner or adjacent faces of these flanges are of tapered or wedge form, with the wedge face in the present instance extending into the end face of the respective extension 10 beyond the face of the flange, so that a wedge member forced inward between two opposing wedge surfaces will tend to effect an outward separation of the two yoke sections. The flanges 12, in the present instance, extend lengthwise substantially throughout the width of the respective extension 10 and their outer sides are parallel to the axes of the yoke sections. This disposition of the flanges 12 enables them to be easily and quickly machined, while no other part of an extension requires machining.

A stem 14 extends between confronting faces 11 of the extensions 10 parallel to the axes of the yoke sections and carries a combination wedge and lock member 15 at each end, the stem being preferably fixedly attached to the inner member, as by threading, while the outer member is adjustably held on the stem by a nut 16. Each member 15 has an elongated wedge portion, in the present instance in the form of two spaced parallel ribs 17, with their outer faces or sides tapered in complemental relation to the respective wedge surfaces of a pair of flanges 12. It is apparent that when the members 15 are drawn toward each other by a tightening of the nut 16 on the stem 14, said wedge portions enter the spaces between the pairs of opposing flanges 12 and coact with the wedge faces thereof to force the yoke sections apart to effect a predetermined spacing of the axes of their tube receiving openings to suit desired tube spacing.

Each member 15 is provided at each of opposite side edges in parallel relation to the wedge portion 17, and at the same side thereof, with inwardly projecting lips or flanges 20 of less depth than said wedge portion and adapted to lap the outer sides of the respective flanges 12 on the yoke sections and have stop engagement therewith when the yoke sections have reached a predetermined limit of outward adjustment. It is apparent that this type of wedging and locking means has the advantage that different center distances of return bends can be provided for by merely changing the dimensions of the members 15 without any change in the yoke sections themselves, which, in practice, is an important factor.

In use, the fastening means embodying the invention is applied to the yoke sections and tightened to rigidly hold the latter in proper spaced relation during rolling-in of the tubes, the U-bend, of course, being removed during such operation. The tightening of the fastening means forces the yoke sections apart to the limit permitted by the engaging stop flanges 12, 20, so that the permissible center to center spacing of the tubes is predetermined and the U-bend when applied wil seat perfectly in the sections. When the U-bend is in place, the clamping nut on the fastening means may be slightly released to provide a slight amount of flexibility. This releasing action is some times found to be desirable to said bringing the U-bend to proper seat.

The present form of fastening provides in itself not only a rigid clamping means for the yoke sections, but a simple and efficient means for both effecting a forced spacing of the sections and a limit or stop for such action when a predetermined center spacing of the sections has been obtained. The simplicity, compactness, form and arrangement of the parts of this fastening means enables it to be produced at low cost and by simple and inexpensive machining operations.

It also enables the center spacing of a yoke set to be changed to suit requirements by simply using wedge members 15 having proper dimensions and stop provisions for the purpose, and without any change whatsoever in the yoke sections. This is an important advantage not present in the structure of my said former patent, for with it any change in center spacing requirements of the tubes necessitates either a complete substitution of yoke sections with proper space limit provisions or machining operations on the sections themselves to vary the stop provisions of the spline parts 24, 25.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a return bend fitting, a pair of separable yoke sections having extensions on their adjacent sides with spaced confronting faces, and a flange on the inner and outer side of each extension disposed in planes parallel to the section axes and to each other, and fastening means for the sections including a pair of opposing wedge members, and means for drawing such members toward each other, said members having spacing wedge coaction with the confronting faces of said extensions and also having flanges for engaging the outer sides of said extension flanges to limit the section spacing action of the wedge members a predetermined extent.

2. In a return bend fitting, a pair of separable tube receiving yoke sections having extensions on their adjacent sides with spaced confronting faces, each extension having a flange on each inner and outer side with the flanges on one extension substantially parallel to those on the other extension, and fastening means for the sections including a pair of opposing wedge members and means for drawing said members toward each other in a plane substantially parallel to the axes of the sections, said members each having opposed wedge surfaces for spacing wedge coaction with the confronting faces of said extensions when the members are drawn toward each other and having flanges for engaging the respective extension flanges to limit the section spreading action of the members and lock the sections against relative spreading, said extension and member flanges being disposed so as not to have spread limiting coaction until the sections have been forced apart a predetermined extent.

CLARENCE B. HARBISON.